( 12 ) United States Patent
Elias et al.

(10) Patent No.: US 11,467,246 B2
(45) Date of Patent: Oct. 11, 2022

(54) DETERMINING A POSITION OF A MOBILE DEVICE WITHIN BUILDINGS

(71) Applicant: Fraunhofer Portugal Research, Oporto (PT)

(72) Inventors: Dirk Elias, Matosinhos (PT); Lourenço Castro, Oporto (PT); Vânia Guimarães, Vila Nova de Gaia (PT)

(73) Assignee: Fraunhofer Portugal Research, Oporto (PT)

( * ) Notice: Subject to any disclaimer, the term of this patent is extended or adjusted under 35 U.S.C. 154(b) by 486 days.

(21) Appl. No.: 15/796,496

(22) Filed: Oct. 27, 2017

(65) Prior Publication Data

US 2018/0067186 A1    Mar. 8, 2018

Related U.S. Application Data

(63) Continuation of application No. PCT/EP2015/059543, filed on Apr. 30, 2015.

(51) Int. Cl.
*G01S 5/02* (2010.01)

(52) U.S. Cl.
CPC .......... *G01S 5/0252* (2013.01); *G01S 5/0257* (2013.01); *G01S 5/0263* (2013.01)

(58) Field of Classification Search
CPC ................. G01S 5/0257; G01S 5/0263; G01S 5/0252–02524; G01S 5/016; G01L 5/0252; G01L 5/0257; G01L 5/0263
See application file for complete search history.

(56) References Cited

U.S. PATENT DOCUMENTS

| 2010/0331010 | A1* | 12/2010 | Ische | G01S 5/0257 |
| | | | | 455/456.1 |
| 2013/0244700 | A1 | 9/2013 | Elias | |
| 2014/0267234 | A1 | 9/2014 | Hook et al. | |
| 2015/0045072 | A1 | 2/2015 | Chou et al. | |
| 2015/0281910 | A1* | 10/2015 | Choudhury | G01S 5/021 |
| | | | | 455/456.1 |
| 2016/0077189 | A1 | 3/2016 | Elias | |
| 2016/0195605 | A1* | 7/2016 | Ryan | G01C 21/206 |
| | | | | 398/118 |

FOREIGN PATENT DOCUMENTS

| WO | 2012/059542 A1 | 5/2012 |
| WO | 2014/074837 A1 | 5/2014 |
| WO | 2014/187850 A1 | 11/2014 |
| WO | 2015/120908 A1 | 8/2015 |

\* cited by examiner

*Primary Examiner* — Lester G Kincaid
*Assistant Examiner* — Dung L Lam
(74) *Attorney, Agent, or Firm* — Perkins Coie LLP; Michael A. Glenn

(57) ABSTRACT

A mobile device is configured for determining a position of the mobile device within buildings, the mobile device including: one or more motion sensors; one or more proximity sensors; a relative feature spot map establishing module; wherein the relative feature spot map establishing module is configured for transmitting the one or more relative feature spot maps to an absolute coordinates determining module configured for determining absolute coordinates of the mobile device; wherein the absolute coordinates determining module is configured for determining the absolute coordinates of the position of the mobile device by determining to which absolute feature spot map of the absolute feature spot maps the one or more relative feature spot map correspond.

17 Claims, 5 Drawing Sheets

DETERMINING A POSITION OF A MOBILE DEVICE WITHIN BUILDINGS

CROSS-REFERENCE TO RELATED APPLICATIONS

This application is a continuation of copending International Application No. PCT/EP2015/059543, filed Apr. 30, 2015, which is incorporated herein in its entirety by this reference thereto.

The invention refers to concepts for precise indoor tracking. Whereas global navigation satellite systems provide excellent accuracy for outdoor tracking, such systems are usually not suitable for indoor tracking as buildings often inhibit the communication between the satellites and the mobile tracking devices of such systems.

BACKGROUND OF THE INVENTION

Therefore, mobile inertial location tracking systems are used for indoor tracking. However, mobile inertial location tracking systems suffer from accumulating errors due to sensor noise and the initial absence of absolute position information if not used permanently. Thus, reference systems are used to recalibrate the system sporadically. Such reference systems usually comprise feature spots, also referred to as reference points, of which absolute coordinates are known. Absolute coordinates are such coordinates which refer to a geographic coordinate system like the latitude-longitude system. Such feature spots may also be called absolute feature spots. In contrast to that, relative coordinates are such coordinates which refer to a local coordinate system which is not linked to a geographic coordinate system. Feature spots which are described by a relative coordinates may be called relative feature spots. In addition, absolute feature spots as well as relative feature spots might contain information about the heading.

A mobile inertial location tracking system is known from WO 2014/074837 A1. The principle of that system is that inertial tracking, also called dead reckoning, gets initiated when the mobile device is entering a building. However, the drawback of such a system is that the absolute position of the entry into the building needs to be known. WO 2014/074837 A1 proposes to determine the absolute position using so called seed landmarks which are essentially entry doors of the building, whose absolute coordinates are known. However, if there is no seed landmark available or the mobile device is not capable of detecting a seed landmark, the starting point of the dead reckoning is not known so that the inertial tracking does not provide an accurate position of the mobile device.

A mobile inertial location tracking system is known from WO 2014/074837 A1. The principle of that system is that inertial tracking, also called dead reckoning, gets initiated when the mobile device is entering a building. However, the drawback of such a system is that the absolute position of the entry into the building needs to be known. WO 2014/074837 A1 proposes to determine the absolute position using so called seed landmarks which are essentially entry doors of the building, whose absolute coordinates are known. However, if there is no seed landmark available or the mobile device is not capable of detecting a seed landmark, the starting point of the dead reckoning is not known so that the inertial tracking does not provide an accurate position of the mobile device.

SUMMARY

According to an embodiment, a mobile device configured for determining a position of the mobile device within buildings may have: one or more motion sensors being configured for detecting directions and/or distances of a movement of the mobile device; one or more proximity sensors being configured for detecting characteristics of one or more electromagnetic fields; a relative feature spot map establishing module configured for establishing one or more relative feature spot maps having relative coordinates of the movement of the mobile device and relative coordinates of relative feature spots, wherein the establishing of the one or more relative feature spot maps is based on the detected directions and/or distances of the movement of the mobile device and based on the detected characteristics of the one or more electromagnetic fields; wherein the relative feature spot map establishing module is configured for transmitting the one or more relative feature spot maps to an absolute coordinates determining module configured for determining absolute coordinates of the mobile device; wherein the absolute coordinates determining module is configured for receiving a plurality of absolute feature spot maps from a memory, wherein each absolute feature spot map of the absolute feature spot maps has absolute coordinates of feature spots of one building of the buildings; wherein the absolute coordinates determining module is configured for determining the absolute coordinates of the position of the mobile device by determining to which absolute feature spot map of the absolute feature spot maps the one or more relative feature spot map correspond.

According to an embodiment, a mobile device configured for determining a position of the mobile device within buildings may have: one or more motion sensors being configured for detecting directions and/or distances of a movement of the mobile device; one or more proximity sensors being configured for detecting characteristics of one or more electromagnetic fields; a relative feature spot map establishing module configured for establishing one or more relative feature spot maps having relative coordinates of the movement of the mobile device and relative coordinates of relative feature spots, wherein the establishing of the one or more relative feature spot maps is based on the detected directions and/or distances of the movement of the mobile device and based on the detected characteristics of the one or more electromagnetic fields; wherein the relative feature spot map establishing module is configured for transmitting the one or more relative feature spot maps to an absolute coordinates determining module configured for determining absolute coordinates of the mobile device; wherein the absolute coordinates determining module is configured for receiving a plurality of absolute feature spot maps from a memory, wherein each absolute feature spot map of the absolute feature spot maps has absolute coordinates of feature spots of one building of the buildings; wherein the absolute coordinates determining module is configured for determining the absolute coordinates of the position of the mobile device by determining to which absolute feature spot map of the absolute feature spot maps the one or more relative feature spot map correspond.

Another embodiment may have a relative feature spot map establishing module configured for determining a position of a mobile device within buildings, wherein the mobile device has: one or more motion sensors being configured for detecting directions and/or distances of a movement of the mobile device; one or more proximity sensors being configured for detecting characteristics of one or more electromagnetic fields; wherein the relative feature spot map establishing module is configured for establishing one or more relative feature spot maps having relative coordinates of the movement of the mobile device and relative coordinates of relative feature spots, wherein the establishing of the one or more relative feature spot maps is based on the detected directions and/or distances of the movement of the mobile device and based on the detected characteristics of the one or more electromagnetic fields; wherein the relative feature spot map establishing module is configured for transmitting the one or more relative feature spot maps to an absolute coordinates determining module configured for determining absolute coordinates of the position of the mobile device; wherein the absolute coordinates determining module is configured for receiving a plurality of absolute feature spot maps from a memory, wherein each absolute feature spot map of the absolute feature spot maps has absolute coordinates of feature spots of one building of the buildings; wherein the absolute coordinates determining module is configured for determining the absolute coordinates of the position of the mobile device by determining to which absolute feature spot map of the absolute feature spot maps the one or more relative feature spot map corresponds.

Another embodiment may have an absolute coordinates determining module configured for determining the absolute coordinates of a position of a mobile device within buildings, wherein the mobile device has: one or more motion sensors being configured for detecting directions and/or distances of a movement of the mobile device; one or more proximity sensors being configured for detecting characteristics of one or more electromagnetic fields; a relative feature spot map establishing module configured for establishing one or more relative feature spot maps having relative coordinates of the movement of the mobile device and relative coordinates of relative feature spots, wherein the establishing of the one or more relative feature spot maps is based on the detected directions and/or distances of the movement of the mobile device and based on the detected characteristics of the one or more electromagnetic fields; wherein the absolute coordinates determining module is configured for receiving the one or more relative feature spot maps from the relative feature spot map establishing module; wherein the absolute coordinates determining module is configured for receiving a plurality of absolute feature spot maps from a memory, wherein each absolute feature spot map of the absolute feature spot maps has absolute coordinates of feature spots of one building of the buildings; wherein the absolute coordinates determining module is configured for determining the absolute coordinates of the position of the mobile device by determining to which absolute feature spot map of the absolute feature spot maps the one or more relative feature spot map corresponds.

Another embodiment may have a system having one or more mobile devices, a relative feature spot map establishing module, an absolute coordinates determining module and a memory, the system being configured for determining a position of the one or more mobile devices within buildings, each mobile device of the one or more mobile devices having: one or more motion sensors being configured for detecting directions and/or distances of a movement of the mobile device; one or more proximity sensors being configured for detecting characteristics of one or more electromagnetic fields; wherein the relative feature spot map establishing module is configured for establishing one or more relative feature spot maps having relative coordinates of the movement of the mobile device and relative coordinates of relative feature spots, wherein the establishing of the one or more relative feature spot maps is based on the detected directions and/or distances of the movement of the mobile device and based on the detected characteristics of the one or more electromagnetic fields; wherein the relative feature spot map establishing module is configured for transmitting the one or more relative feature spot maps to the absolute coordinates determining module configured for determining absolute coordinates of the position of the mobile device; wherein the absolute coordinates determining module is configured for receiving a plurality of absolute feature spot maps from the memory, wherein each absolute feature spot map of the absolute feature spot maps has absolute coordinates of feature spots of one building of the buildings; wherein the absolute coordinates determining module is configured for determining absolute coordinates of the position of the mobile device by determining to which absolute feature spot map of the absolute feature spot maps the one or more relative feature spot maps correspond.

According to another embodiment, a method for determining a position of a mobile device within buildings may have the steps of: establishing a plurality of absolute feature spot maps, wherein each absolute feature spot map of the absolute feature spot maps has absolute coordinates of feature spots of one building of the buildings; establishing one or more relative feature spot maps having relative coordinates of a movement of the mobile device and relative coordinates of relative feature spots, wherein the establishing of the one or more relative feature spot maps is based on directions and/or distances of a movement of the mobile device and on characteristics of one or more electromagnetic fields, which are detected by using one or more motion sensors of the mobile device and by using one or more proximity sensors of the mobile device; determining absolute coordinates of the position of the mobile device by determining to which absolute feature spot map of the absolute feature spot maps the one or more relative feature spot maps correspond.

Another embodiment may have a non-transitory digital storage medium having a computer program stored thereon to perform the method for determining a position of a mobile device within buildings, the method having the steps of: establishing a plurality of absolute feature spot maps, wherein each absolute feature spot map of the absolute feature spot maps has absolute coordinates of feature spots of one building of the buildings; establishing one or more relative feature spot maps having relative coordinates of a movement of the mobile device and relative coordinates of relative feature spots, wherein the establishing of the one or more relative feature spot maps is based on directions and/or distances of a movement of the mobile device and on characteristics of one or more electromagnetic fields, which are detected by using one or more motion sensors of the mobile device and by using one or more proximity sensors of the mobile device; determining absolute coordinates of the position of the mobile device by determining to which absolute feature spot map of the absolute feature spot maps the one or more relative feature spot maps correspond, when said computer program is run by a computer.

In one aspect, the invention provides a mobile device configured for determining a position of the mobile device within buildings, the mobile device comprising:
one or more motion sensors being configured for detecting directions and/or distances of a movement of the mobile device;
one or more proximity sensors being configured for detecting characteristics of one or more electromagnetic fields;
a relative feature spot map establishing module configured for establishing one or more relative feature spot maps comprising relative coordinates of the movement of the mobile device and relative coordinates of relative feature spots, wherein the establishing of the one or more relative feature spot maps is based on the detected directions and/or distances of the movement of the mobile device and based on the detected characteristics of the one or more electromagnetic fields;

wherein the relative feature spot map establishing module is configured for transmitting the one or more relative feature spot maps to an absolute coordinates determining module configured for determining absolute coordinates of the mobile device;

wherein the absolute coordinates determining module is configured for receiving a plurality of absolute feature spot maps from a memory, wherein each absolute feature spot map of the absolute feature spot maps comprises absolute coordinates of feature spots of one building of the buildings;

wherein the absolute coordinates determining module is configured for determining the absolute coordinates of the position of the mobile device by determining to which absolute feature spot map of the absolute feature spot maps the one or more relative feature spot map correspond.

The mobile device according to invention provides accurate indoor tracking without detecting an absolute feature point. The mobile device just needs to determine relative coordinates of feature points or absolute identifiers of the feature points, such as a Wi-Fi or Bluetooth MAC address. Wi-Fi or Bluetooth MAC addresses, being unique, may be used to identify the current building, provided it is present on the maps database By comparing the relative feature points map containing the relative coordinates of the feature points or the absolute identifiers of the feature points to a plurality of absolute feature spot maps containing absolute coordinates of feature spots, that absolute feature spot map corresponding to the relative feature spot map may be identified. By matching of the identified absolute feature spot map and the relative feature spot map the absolute coordinates of the position of the mobile device may be found easily.

The mobile device may be a mobile phone, such as a smartphone, or a Personal Digital Assistant (PDA), a tablet computer, a media player, a digital camera, a smart watch or the like.

Feature spots may be point-shaped, line-shaped, 2-dimensional or even 3-dimensional. Therefore, a feature spot may be described by one set of coordinates, two sets of coordinates or even more sets of coordinates.

Suitable feature spots may be structural elements of the building, such as doors, elevators, staircases or toilet cabins, whose relative coordinates may be sensed with the motion sensors of the mobile device.

Further suitable feature spots may be magnetic fluctuation spots of the natural earth magnetic field, whose relative coordinates may be sensed by a magnetic field sensor of the mobile device, which is configured as a proximity sensor regarding to the distance between the fluctuation spot and the mobile device.

Furthermore, radio beacons primarily having another purpose than allowing navigation may be used as feature spots as well. Examples for such feature spots are base stations of Wi-Fi, GSM, Bluetooth, ZigBee, Z-Wave and ANT. The relative coordinates of such base stations may be sensed by the proximity sensors of the mobile device.

Also electromagnetic navigation beacons, such as optical navigation beacons, magnetic navigation beacons or radio navigation beacons, transmitting navigational signals may be used as feature spots. The relative coordinates of such beacons may also be sensed by the proximity sensors of the mobile device. It has to be noted that the use of electromagnetic navigation beacons may enhance the accuracy of the indoor tracking. However, they are not mandatory so that the concept of the present invention does not need a special infrastructure. In that sense the concept of the present invention may be called infra-structure free.

The relative coordinates of the movement of the mobile device may be derived from an inertial tracking algorithm in particular in combination with a recalibration algorithm as described in published patent applications WO 2012059542, WO2014187850 or unpublished patent application PCT/EP2014/052953.

According to an embodiment of the invention the mobile device comprises the absolute coordinates determining module and/or the memory. By these features a standalone device which does not need any connection to external devices during operations is achieved.

According to an embodiment of the invention the absolute coordinates determining module and/or the memory are located at a remote location, wherein the relative feature spot map establishing module is configured for transmitting the relative feature spot map to the absolute coordinates determining module using a wireless interface of the mobile device. By these features the processing capacity and/or the memory capacity of the mobile device might be lowered.

In another embodiment of the invention even the relative feature spot establishing module is located at a remote location. However, in that case the one or more motion sensors and the one or more proximity sensors need to be connected to the relative feature spot establishing module via a wireless interface.

According to an embodiment of the invention the one or more proximity sensors comprise a short range wireless interface, an optical sensor and/or a magnetic field strength sensor.

According to an embodiment of the invention the one or more motion sensors comprise a gyroscope, an accelerometer, a magnetic field direction sensor and/or an air-pressure sensor.

According to an embodiment of the invention the relative feature spot map establishing module is configured for determining the relative coordinates of electro-magnetic field strength fluctuations, electro-magnetic beacons and/or architectural reference points and for incorporating such coordinates into the relative feature spot map as relative feature spots.

The objective of the present invention is further achieved by a relative feature spot map establishing module configured for determining a position of a mobile device within buildings, wherein the mobile device comprises:

one or more motion sensors being configured for detecting directions and/or distances of a movement of the mobile device;

one or more proximity sensors being configured for detecting characteristics of one or more electromagnetic fields;

wherein the relative feature spot map establishing module is configured for establishing one or more relative feature spot maps comprising relative coordinates of the movement of the mobile device and relative coordinates of relative feature spots, wherein the establishing of the one or more relative feature spot maps is based on the detected directions and/or distances of the movement of the mobile device and based on the detected characteristics of the one or more electromagnetic fields;

wherein the relative feature spot map establishing module is configured for transmitting the one or more relative feature spot maps to an absolute coordinates determining module configured for determining absolute coordinates of the position of the mobile device;

wherein the absolute coordinates determining module is configured for receiving a plurality of absolute feature spot maps from a memory, wherein each absolute feature spot map of the absolute feature spot maps comprises absolute coordinates of feature spots of one building of the buildings;

wherein the absolute coordinates determining module is configured for determining the absolute coordinates of the position of the mobile device by determining to which absolute feature spot map of the absolute feature spot maps the one or more relative feature spot map corresponds.

In another aspect is the objective of the present invention and chief by an absolute coordinates determining module configured for determining absolute coordinates of a position of a mobile device within buildings, wherein the mobile device comprises:

one or more motion sensors being configured for detecting directions and/or distances of a movement of the mobile device;

one or more proximity sensors being configured for detecting characteristics of one or more electromagnetic fields;

a relative feature spot map establishing module configured for establishing one or more relative feature spot maps comprising relative coordinates of the movement of the mobile device and relative coordinates of relative feature spots, wherein the establishing of the one or more relative feature spot maps is based on the detected directions and/or distances of the movement of the mobile device and based on the detected characteristics of the one or more electromagnetic fields;

wherein the absolute coordinates determining module is configured for receiving the one or more relative feature spot maps from the relative feature spot map establishing module;

wherein the absolute coordinates determining module is configured for receiving a plurality of absolute feature spot maps from a memory, wherein each absolute feature spot map of the absolute feature spot maps comprises absolute coordinates of feature spots of one building of the buildings;

wherein the absolute coordinates determining module is configured for determining the absolute coordinates of the position of the mobile device by determining to which absolute feature spot map of the absolute feature spot maps the one or more relative feature spot map corresponds.

Furthermore, the objective of the present invention is achieved by a system comprising one or more mobile devices, a relative feature spot map establishing module, an absolute coordinates determining module and a memory, the system being configured for determining a position of the one or more mobile devices within buildings, each mobile device of the one or more mobile devices comprising:

one or more motion sensors being configured for detecting directions and/or distances of a movement of the mobile device;

one or more proximity sensors being configured for detecting characteristics of one or more electromagnetic fields;

wherein the relative feature spot map establishing module is configured for establishing one or more relative feature spot maps comprising relative coordinates of the movement of the mobile device and relative coordinates of at least a part of the feature spots, wherein the establishing of the one or more relative feature spot maps is based on the detected directions and/or distances of the movement of the mobile device and based on the detected characteristics of the one or more electromagnetic fields;

wherein the relative feature spot map establishing module is configured for transmitting the one or more relative feature spot maps to the absolute coordinates determining module configured for determining absolute coordinates of the position of the mobile device;

wherein the absolute coordinates determining module is configured for receiving a plurality of absolute feature spot maps from the memory, wherein each absolute feature spot map of the absolute feature spot maps comprises absolute coordinates of feature spots of one building of the buildings;

wherein the absolute coordinates determining module is configured for determining the absolute coordinates of the position of the mobile device by determining to which absolute feature spot map of the absolute feature spot maps the one or more relative feature spot maps correspond.

According to an embodiment of the invention the system comprises an absolute feature spot map establishing module configured for establishing and/or for refining of the plurality of absolute feature spot maps based on one or more external absolute feature spot maps and based on the one or more relative feature spot maps provided from the one or more mobile devices. By the use of external absolute feature spot maps an initial functionality of the system may be achieved. By the use of the relative feature spot maps the quality and accuracy of the absolute feature spot maps may be enhanced in a repetitive way. Even changes regarding the availability and the absolute coordinates of feature spots of the building may be incorporated into the absolute feature spot maps by these features.

According to an embodiment of the invention the absolute feature spot map establishing module is configured for incorporating a map of structural elements of one building of the buildings and/or a map of electro-magnetic beacons of one building of the buildings, which are contained in the one or more external feature spot maps, into the absolute feature spot map.

According to an embodiment of the invention the absolute feature spot map establishing module is configured for incorporating absolute coordinates of common route patterns and absolute coordinates of at least a part of the feature spots derived from the one or more relative feature spot maps provided from the one or more mobile devices into the one or more absolute feature spot map. Common route patterns represent routes on which movements of the mobile device according to the invention take place more often than on other routes. These common route patterns may be, in addition to the feature spots, used by the absolute coordinates determining module for the purpose of matching of the relative feature spot map to the plurality of absolute feature spot maps by comparing the movement of the mobile device as documented in the relative feature spot map with the common route patterns within the different absolute feature spot maps.

According to an embodiment of the invention the system is configured in such way, that the composition of the absolute feature spot maps of the plurality of absolute feature spot maps depends on time and/or date.

According to an embodiment of the invention the one or more mobile devices are configured for communication with other mobile devices of the one or more mobile devices via a short range wireless interface. By these features the matching of a relative feature spot map to a plurality of absolute feature spot maps may be facilitated.

According to an embodiment of the invention the communication allows: transmitting of the absolute coordinates of the position of a first mobile device of the one or more mobile devices from the first mobile device to a second mobile device of the one or more mobile devices, transmitting an identification code of the one or more absolute feature spot maps, which comprise the absolute coordinates of the position of the respective mobile device, from the first mobile device to a second mobile device of the one or more mobile devices, transmitting the absolute coordinates of one feature spot of one of the one or more relative feature spot maps from the first mobile device to a second mobile devices of the one or more mobile devices and/or transmitting at least a segment of one relative feature spot map of the one or more relative feature spot maps from the first mobile device to the second mobile device of the one or more mobile devices allowing the relative feature spot map establishing module of the second mobile device to join the segment of the one relative feature spot map of the one or more relative feature spot maps from the first mobile device to a segment of one relative feature spot map of the one or more relative feature spot maps of the second mobile device in case the segment of the first mobile device and the segment of the second mobile device are overlapping.

By these features the matching of a relative feature spot map to a plurality of absolute feature spot maps at the side of the second mobile device may be facilitated.

In a further aspect of the invention the objective is achieved by a method for determining a position of a mobile device within buildings, the method comprising the steps of establishing a plurality of absolute feature spot maps, wherein each absolute feature spot map of the absolute feature spot maps comprises absolute coordinates of feature spots of one building of the buildings;

establishing one or more relative feature spot maps comprising relative coordinates of the movement of the mobile device and relative coordinates of relative feature spots, wherein the establishing of the one or more relative feature spot maps is based on directions and/or distances of a movement of the mobile device and on characteristics of one or more electromagnetic fields, which are detected by using one or more motion sensors of the mobile device and by using one or more proximity sensors of the mobile device;

determining absolute coordinates of the position of the mobile device by determining to which absolute feature spot map of the absolute feature spot maps the one or more relative feature spot maps correspond.

In another aspect the objective is achieved by a computer program for, when running on a processor, executing the method according to the invention.

BRIEF DESCRIPTION OF THE DRAWINGS

Embodiments of the present invention will be detailed subsequently referring to the appended drawings, in which.

DETAILED DESCRIPTION OF THE INVENTION

Prior to describing embodiments of the present application, reference is made to FIG. 1 which shows a mobile device as an example of where embodiments described further below may be implemented, as well as environmental facilities which may be used in the embodiments described below in accordance with certain embodiments.

Figure 1:
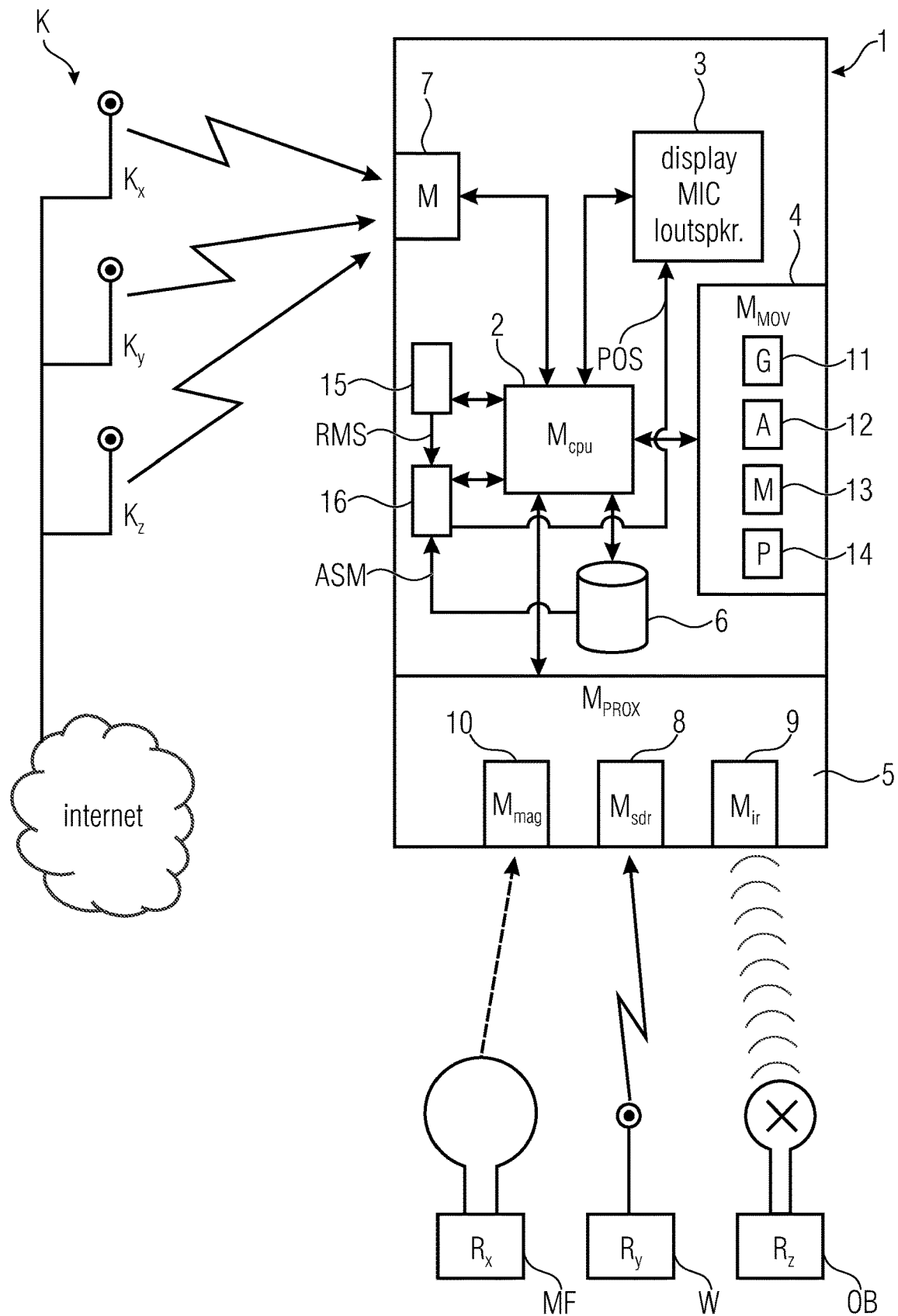
FIG. 1 shows a schematic block diagram of a mobile device according to the invention.

FIG. 1 shows a mobile device 1. It may be a mobile phone, such as a smartphone, or a Personal Digital Assistant (PDA), a media player, a digital camera, a smart watch or the like. The mobile device is shown as comprising a central processing unit 2 operationally connected to user input/output devices 3, such as a display, a speaker and/or a microphone, one or more motion sensors 4 and one or more proximity sensors 5 as well as a memory 6 and wireless interface 7. Again, FIG. 1 is merely treated to be illustrative of an example of a mobile device carried by a bearer, the one or more motion sensors 4 of which are used to perform the position tracking further outlined below and accordingly all elements but the one or more motion sensors 4 are in principle optional as far as the position tracking embodiments described further below are concerned. Nevertheless, examples for the various elements shown in FIG. 1 shall be briefly presented. For example, the wireless interface 7 may be a GSM or other RF interface. One of the examples of a proximity sensor 5 is a short range wireless interface 8. The difference between wireless interface 7 and short range wireless interface 8 shall be the communication range or maximum distance between mobile device 1 on the one hand and base station acting as counterpart of the respective wireless interface 7 and the short range wireless interface 8, respectively, on the other hand still allowing the reception of the base stations signal by the wireless interface 7 and the short range wireless interface 8, respectively. FIG. 1 shows, for example, three exemplary transmission nodes or base stations $K_x$, $K_y$, $K_z$ of a communication network K, here exemplarily coupled to the internet, configured to communicate with the wireless interface 7, and exemplarily one base station W for communicating with mobile device 1 via interface 8. The maximum distance still allowing communication (or at least reception at the mobile device) is higher for interface 7 than for interface 8. The short range wireless interface 8 may, for example be a WIFI, Bluetooth, ZigBee, Z-Wave, ANT or another interface. In principle, proximity sensor 8 does not need to be able to send data, and accordingly, node W needs not to be able to receive data. Rather, proximity sensor 8 is seen as a representative of a sensor being able to receive RF data sent-out by a base station W which, thus, serves as a beacon having a predetermined reference position and allowing for position determination as will be outlined in more detail below.

Further examples for proximity sensors 5 are also shown in FIG. 1: an optical sensor 9 may be able to receive optical signals, i.e. optical beacon signals, sent out by one or more base stations, i.e. optical beacons. Proximity sensor 9 may be infrared-based and may, inter alias, be able to perform optical communication mobile device 1 and the one or more mobile stations R.

A further example of a proximity sensor is shown using reference sign 10: a magnetic field strength sensor 10 detects a strength of the natural magnetic field. The magnetic field strength sensor 10 may, if available, also detect a strength of an artificial magnetic field generated by using one or more magnetic field generators MG, each, thus, acting as a kind of "magnetic beacon". This allows detecting magnetic fluctuation spots MF, regardless if they are caused by the natural magnetic field or an artificial magnetic field. Reference is made, for example, to WO 2012059542 assigned to the same applicant as the present application, for further details regarding exploiting a "magnetic beacon" for detecting the position of a mobile device.

As far as the one or more motion sensors 4 are concerned, FIG. 1 shows that the same may possibly comprise one or more gyroscopes 11, one or more accelerometers 12, one or more magnetic field direction sensor 13 and/or an air-pressure sensor 14 (for measuring elevation changes). For example, the gyroscope 11 measures, based on the principles of angular momentum, an orientation of the mobile device 1 relative to mobile device's coordinates, for example, or an orientation change. The accelerometer 12, for example, measures the mobile device's 1 acceleration/motion. The magnetometer measures the magnetic field, such as magnetic strength and/or direction of the magnetic field at the position of mobile device 1. In fact, magnetic field direction sensor 13 and magnetic field strength sensor 10 may coincide or may largely co-use one or more components. Air-pressure module 14 measures the air pressure the measuring signal of which may be used to measure elevation changes of the mobile device 1.

The mobile device 1 according to the invention is configured for determining a position POS of the mobile device 1 within buildings, the mobile device 1 comprising:

one or more motion sensors 4 being configured for detecting directions and/or distances of a movement M' of the mobile device 1;

one or more proximity sensors 5 being configured for detecting characteristics of one or more electromagnetic fields RWF, MAF;

a relative feature spot map establishing module 15 configured for establishing one or more relative feature spot maps RSM comprising relative coordinates xr, yr of the movement M' of the mobile device 1 and relative coordinates xr, yr of relative feature spots W', MF', ST', EV' (see FIG. 5), wherein the establishing of the one or more relative feature spot maps RSM is based on the detected directions and/or distances of the movement M' of the mobile device 1 and based on the detected characteristics of the one or more electromagnetic fields RWF, MAF;

wherein the relative feature spot map establishing module 15 is configured for transmitting the one or more relative feature spot maps RSM to an absolute coordinates determining module 16 configured for determining absolute coordinates xa, ya of the mobile device 1;

wherein the absolute coordinates determining module 16 is configured for receiving a plurality of absolute feature spot maps ASM from a memory 6, wherein each absolute feature spot map ASM of the absolute feature spot maps ASM comprises absolute coordinates xa, ya of feature spots W, MF, ST, EV (see FIG. 4) of one building of the buildings;

wherein the absolute coordinates determining module 16 is configured for determining the absolute coordinates xa, ya of the position POS of the mobile device 1 by determining to which absolute feature spot map ASM of the absolute feature spot maps ASM the one or more relative feature spot map RSM correspond.

According to an embodiment of the invention the mobile device 1 comprises the absolute coordinates determining module 16 and/or the memory 6.

According to an embodiment of the invention the one or more proximity sensors 5 comprise a short range wireless interface 8, an optical sensor 9 and/or a magnetic field strength sensor 10.

According to an embodiment of the invention the one or more motion sensors 4 comprise a gyroscope 11, an accelerometer 12, magnetic field direction sensor 13 and/or an air-pressure sensor 14.

According to an embodiment of the invention the relative feature spot map establishing module 15 is configured for determining the relative coordinates xr, yr of electro-magnetic field strength fluctuation spots MF, electro-magnetic beacons MF, W, OB and/or architectural reference points ST, EV and for incorporating such coordinates xr, yr into the relative feature spot map RSM as relative feature spots W', MF', ST', EV'.

Furthermore, the invention provides a relative feature spot map establishing module configured for determining a position POS of a mobile device 1 within buildings, wherein the mobile device 1 comprises:

one or more motion sensors 4 being configured for detecting directions and/or distances of a movement M' of the mobile device 1;

one or more proximity sensors 5 being configured for detecting characteristics of one or more electromagnetic fields RWF, MAF;

wherein the relative feature spot map establishing module 15 is configured for establishing one or more relative feature spot maps RSM comprising relative coordinates xr, yr of the movement M' of the mobile device 1 and relative coordinates xr, yr of relative feature spots W', MF', ST', EV', wherein the establishing of the one or more relative feature spot maps RSM is based on the detected directions and/or distances of the movement M' of the mobile device 1 and based on the detected characteristics of the one or more electromagnetic fields RWF, MAF;

wherein the relative feature spot map establishing module 15 is configured for transmitting the one or more relative feature spot maps RSM to an absolute coordinates determining module 16 configured for determining absolute coordinates xa, ya of the position POS of the mobile device 1;

wherein the absolute coordinates determining module 16 is configured for receiving a plurality of absolute feature spot maps ASM from a memory 6, wherein each absolute feature spot map ASM of the absolute feature spot maps ASM comprises absolute coordinates xa, ya of feature spots W, MF, ST, EV of one building of the buildings;

wherein the absolute coordinates determining module 16 is configured for determining the absolute coordinates xa, ya of the position POS of the mobile device 1 by determining to which absolute feature spot map ASM of the absolute feature spot maps ASM the one or more relative feature spot map RSM corresponds.

In another aspect the invention provides an absolute coordinates determining module configured for determining the absolute coordinates xa, ya of a position POS of a mobile device 1 within buildings, wherein the mobile device 1 comprises:

one or more motion sensors 4 being configured for detecting directions and/or distances of a movement M' of the mobile device 1;

one or more proximity sensors 5 being configured for detecting characteristics of one or more electromagnetic fields RWF, MAF;

a relative feature spot map establishing module 15 configured for establishing one or more relative feature spot maps RSM comprising relative coordinates xr, yr of the movement M' of the mobile device 1 and relative coordinates xr, yr of relative feature spots W', MF', ST', EV', wherein the establishing of the one or more relative feature spot maps RSM is based on the detected directions and/or distances of the movement M' of the mobile device and based on the detected characteristics of the one or more electromagnetic fields RWF. MAF;

wherein the absolute coordinates determining module 16 is configured for receiving the one or more relative feature spot maps RSM from the relative feature spot map establishing module 15; 17;

wherein the absolute coordinates determining module 16 is configured for receiving a plurality of absolute feature spot maps ASM from a memory 6, wherein each absolute feature spot map ASM of the absolute feature spot maps ASM comprises absolute coordinates of feature spots of one building of the buildings;

wherein the absolute coordinates determining module 16 is configured for determining the absolute coordinates xa, ya of the position POS of the mobile device 1 by determining to which absolute feature spot map ASM of the absolute feature spot maps ASM the one or more relative feature spot map RSM corresponds.

Figure 2:
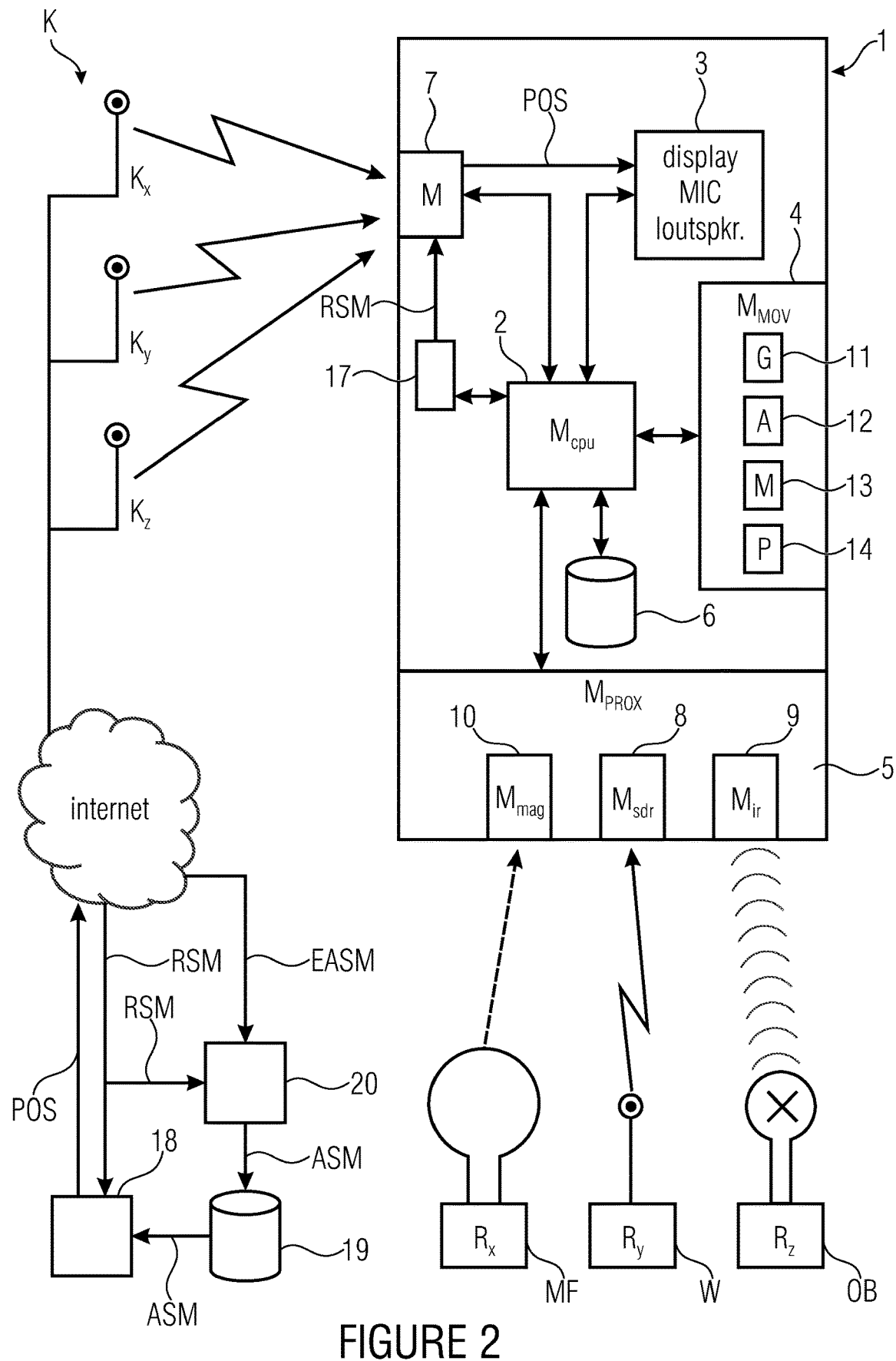
FIG. 2 shows a schematic block diagram of a system according to the invention.

FIG. 2 shows a schematic block diagram of a system according to the invention.

The system comprises one or more mobile devices 1, a relative feature spot map establishing module 17, an absolute coordinates determining module 18 and a memory 19, the system being configured for determining a position POS of the one or more mobile devices 1 within buildings, each mobile device 1 of the one or more mobile devices 1 comprises:

one or more motion sensors 4 being configured for detecting directions and/or distances of a movement M' of the mobile device 1;

one or more proximity sensors 5 being configured for detecting characteristics of one or more electromagnetic fields RWF, MAF;

wherein the relative feature spot map establishing module 17 is configured for establishing one or more relative feature spot maps RSM comprising relative coordinates xr, yr of the movement M' of the mobile device 1 and relative coordinates xr, yr of relative feature spots W', MF', ST', EV', wherein the establishing of the one or more relative feature spot maps RSM is based on the detected directions and/or distances of the movement M' of the mobile device 1 and based on the detected characteristics of the one or more electromagnetic fields RWF, MAF;

wherein the relative feature spot map establishing module 17 is configured for transmitting the one or more relative feature spot maps RSM to the absolute coordinates determining module 18 configured for determining absolute coordinates xa, ya of the position POS of the mobile device 1;

wherein the absolute coordinates determining module 18 is configured for receiving a plurality of absolute feature spot maps ASM from the memory 19, wherein each absolute feature spot map ASM of the absolute feature spot maps ASM comprises absolute coordinates xa, ya of feature spots W, MF, ST, EV of one building of the buildings;

wherein the absolute coordinates determining module 18 is configured for determining absolute coordinates xa, ya of the position POS of the mobile device 1 by determining to which absolute feature spot map ASM of the absolute feature spot maps ASM the one or more relative feature spot maps RSM correspond.

According to an embodiment of the invention the absolute coordinates determining module 18 and/or the memory 19 are located at a remote location, wherein the relative feature spot map establishing module 17 is configured for transmitting the relative feature spot map RSM to the absolute coordinates determining module 18 using a wireless interface 7; 8 of the mobile device 1.

According to an embodiment of the invention the system comprises an absolute feature spot map establishing module 20 configured for establishing and/or for refining of the plurality of absolute feature spot maps ASM based on one or more external absolute feature spot maps EASM and based on the one or more relative feature spot maps RSM provided from the one or more mobile devices 1.

According to an argument of the invention the absolute feature spot map establishing module 2 is configured for incorporating a map of structural elements WA, DO, ST of one building of the buildings and/or a map of electromagnetic beacons W of one building of the buildings, which are contained in the one or more external feature spot maps EASM, into the absolute feature spot map ASM.

According to an embodiment of the invention the absolute feature spot map establishing module 20 is configured for incorporating absolute coordinates xa, ya of common route patterns CRP and absolute coordinates xa, ya of at least a part of the feature spots W, MF, ST, EV derived from the one or more relative feature spot maps RSM provided from the one or more mobile devices 1 into the one or more absolute feature spot maps ASM.

According to an embodiment of the invention the one or more mobile devices 1 are configured for communication with other mobile devices 1 of the one or more mobile devices 1 via a short range wireless interface 8.

According to an embodiment of the invention the system is configured in such way, that the composition of the absolute feature spot maps ASM of the plurality of absolute feature spot maps ASM depends on time and/or date.

According to an embodiment of the invention the communication allows: transmitting of the absolute coordinates xa, ya of the position POS of a first mobile device 1 of the one or more mobile devices 1 from the first mobile device 1 to a second mobile devices 1 of the one or more mobile devices 1, transmitting an identification code of the one or more absolute feature spot maps ASM, which comprise the absolute coordinates of the position of the respective mobile device 1, from the first mobile device 1 to a second mobile devices 1 of the one or more mobile devices 1 and/or transmitting the absolute coordinates of one feature spot of one of the one or more relative feature spot maps from the first mobile device 1 to a second mobile devices 1 of the one or more mobile devices 1 and/or transmitting at least a segment of one relative feature spot map RSM of the one or more relative feature spot maps RSM from the first mobile device 1 to the second mobile device 1 of the one or more mobile devices 1 allowing the relative feature spot map establishing module 15; 17 of the second mobile device 1 to join the segment of the one relative feature spot map RSM of the one or more relative feature spot maps RSM from the first mobile device 1 to a segment of one relative feature spot map RSM of the one or more relative feature spot maps RSM of the second mobile device 1 in case the segment of the first mobile device 1 and the segment of the second mobile device 1 are overlapping.

In a further aspect the invention provides a method for determining a position POS of a mobile device 1 within buildings, the method comprising the steps of establishing a plurality of absolute feature spot maps ASM, wherein each absolute feature spot map ASM of the absolute feature spot maps ASM comprises absolute coordinates xa, ya of feature spots W, MF, ST, EV of one building of the buildings;

establishing one or more relative feature spot maps RSM comprising relative coordinates xr, yr of a movement M' of the mobile device 1 and relative coordinates of relative feature spots W', MF', ST', EV', wherein the establishing of the one or more relative feature spot maps RSM is based on directions and/or distances of a movement M' of the mobile device 1 and on characteristics of one or more electromagnetic fields RWF, MAF, which are detected by using one or more motion sensors 4 of the mobile device 1 and by using one or more proximity sensors 5 of the mobile device 1;

determining absolute coordinates xa, ya of the position POS of the mobile device 1 by determining to which absolute feature spot map ASM of the absolute feature spot maps ASM the one or more relative feature spot maps RSM correspond.

In a further embodiment the invention provides a computer program for, when running on a processor, executing the method according to the preceding claim.

Up to now, the description of FIG. 1 and FIG. 2 focused on the hardware of mobile device 1. Many of the tasks described so far, however, may be partially shifted from the respective components described so far to processing unit 2. In other words, each of elements 3, 7, 8, 9, 10, 11, 12, 13, 14, 15, 16 17, 18 and 20 may have one or more software components which run on processing unit 2. This may be true, for example, for protocols associated with any of the interfaces and filters or recognition algorithms used for detecting beacon signals.

Figure 3:
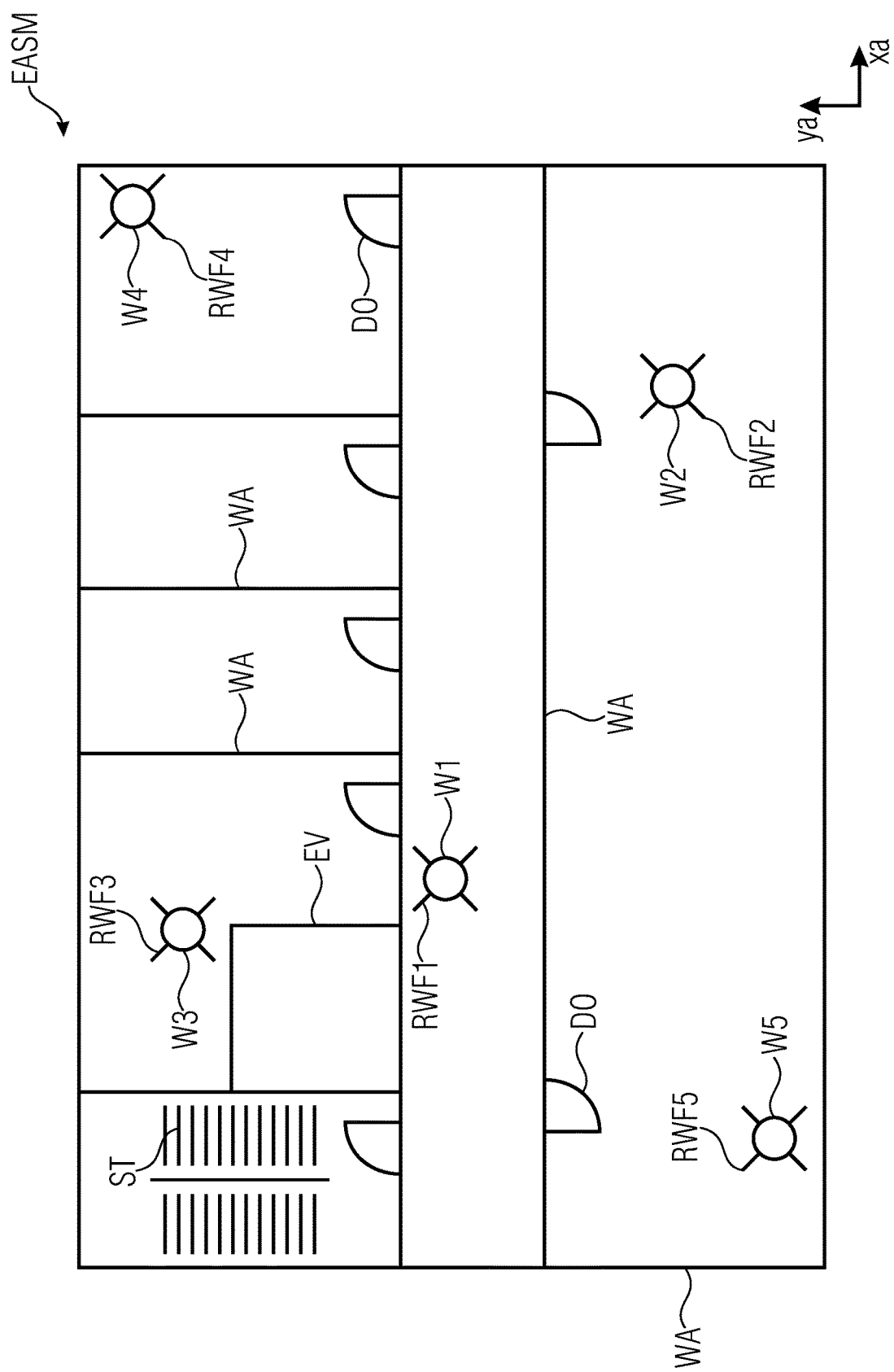
FIG. 3 shows an exemplary external absolute feature spot map.
Figure 4:
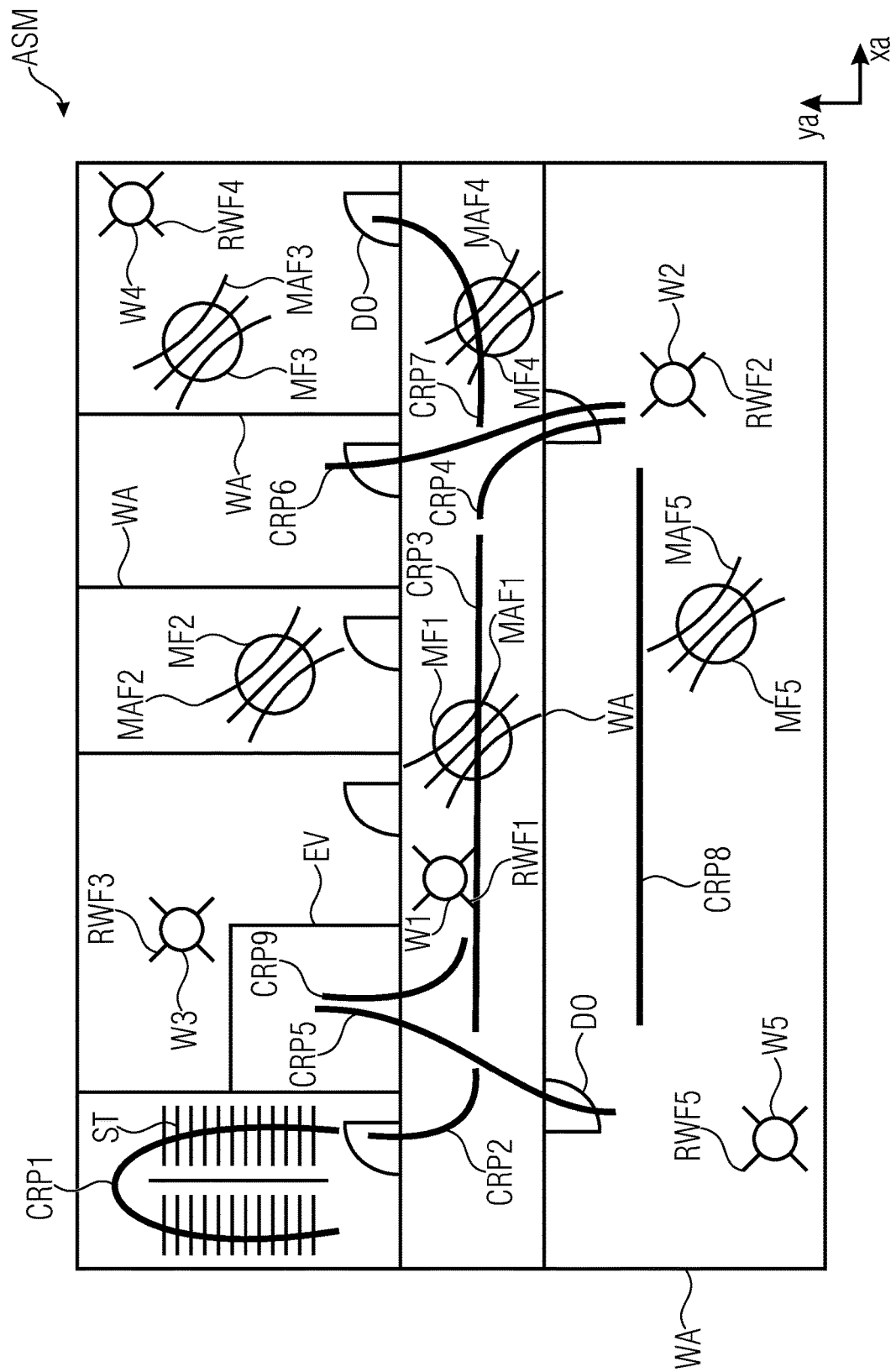
FIG. 4 shows an exemplary absolute feature spot map.
Figure 5:
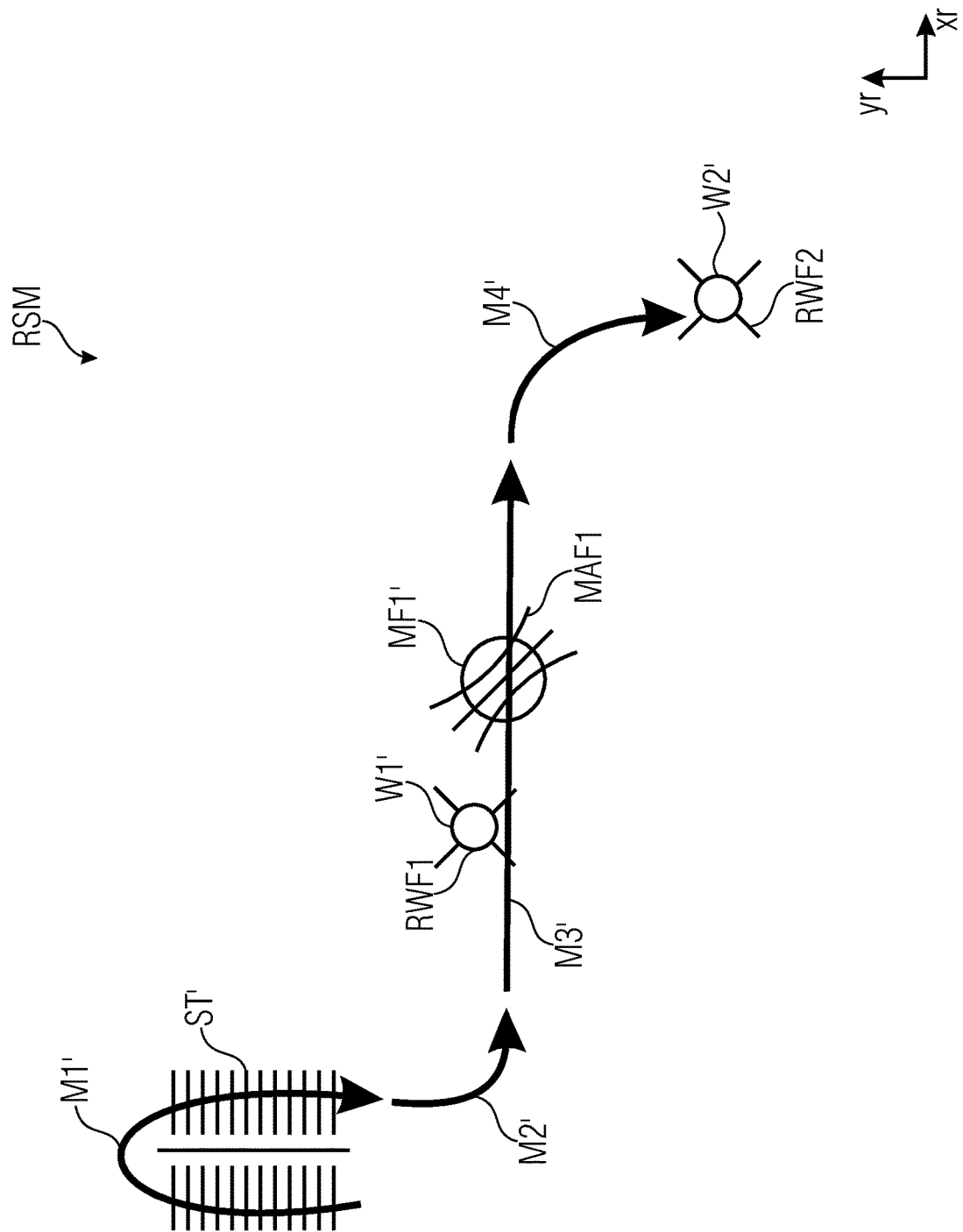
FIG. 5 shows an exemplary relative feature spot map.

FIG. 3 shows an exemplary external absolute feature spot map EASM. The exemplary external absolute feature spot map EASM comprises a map of structural elements of the building such as walls WA, doors DO, a staircase ST and an elevator EV. The absolute coordinates xa, ya of each of the structural elements WA, DO, ST and EV are known from external sources and may serve as absolute feature spots WA, DO, ST and EV in the absolute feature spot map ASM as shown in FIG. 4. The structural elements WA, DO, ST and EV may be sensed by the motion sensors 4 of the mobile device 1 so that they are may be detected and an incorporated into the relative feature spot map RSM as relative feature spots WA', DO', ST' and EV' as shown in FIG. 5.

Furthermore, the exemplary external absolute feature spot map comprises four electromagnetic beacons W1 to W4 which may be, for example, base stations of a Wi-Fi system. The absolute coordinates xa, ya of the electromagnetic beacons W1 to W4 are known from the same or from another external source so that the beacons W1 to W4 may serve as absolute feature spots W1 to W4 as well. The radio wave fields RWF1 to RWF4 may be sensed by the proximity sensor 5 of the mobile device 1 so that the beacons W1 to W4 also may be incorporated into the relative feature spot map RPM as relative feature spots.

FIG. 4 shows an exemplary absolute feature spot map ASM, which is based on the external absolute feature spot map EASM shown in FIG. 3. Therefore, it comprises the absolute coordinates xa, ya of the structural elements WA, DO, ST and EV and of the electromagnetic beacons W1 to W4.

Furthermore, the absolute feature spot map ASM comprises absolute coordinates xa, ya of magnetic fluctuation spots MF1 to MF5, which are, for example, defined by strong fluctuations of the natural earth magnetic field MAF as illustrated by the sections MAF1, MAF2, MAF3, MAF4 and MAF5 of the magnetic field MAF. Furthermore, the absolute feature spot map ASM comprises absolute coordinates xa, ya of common route patterns CRP1 to CRP8.

The absolute coordinates xa, ya of the magnetic fluctuation spots MF1 to MF5 and the common route patterns CRP1 to CRP8 may be derived from relative feature spot maps RSM by matching the relative feature spot maps RSM to the external absolute feature spot map EASM, which allows to convert the relative coordinates xr, yr from the relative feature spot maps RSM into absolute coordinates xa, ya for the absolute feature spot map ASM.

FIG. 5 shows an exemplary relative feature spot map RSM comprising relative coordinates xr, yr of a movement M', which consists of the legs M1' to M4', of the mobile device 1. Furthermore, the relative feature spot map RSM comprises relative coordinates xr, yr of the radio beacons W1' and W2' and relative coordinates xr, yr of magnetic fluctuation spot MF1'.

When comparing the relative feature spot map RSM to the absolute feature spot map ASM of FIG. 4, it is apparent that leg M1' of the movement M' corresponds to the common route pattern CRP1, M2' to CRP2, M3' to CRP3 and M4' to CRP4. Furthermore, the beacons W1' and W2' obviously correspond to the beacons W1 and W2 as well as magnetic fluctuation spot MF1' corresponds to magnetic fluctuation spot MF. These similarities of the relative feature spot map RSM and the absolute feature spot map ASM allow the conclusion that the relative feature spot map RSM of FIG. 5 corresponds to the absolute feature spot map ASM of FIG. 4.

Feature spot maps based on disturbances of the earth magnetic field through the building or radio beacons, or feature spot maps based on existing infrastructure (Wi-Fi, GSM, Bluetooth beacons etc.) can also serve as a reference system, or can even be used as a stand-alone positioning system. But they typically suffer from three disadvantages in reality:

a) to serve as absolute feature spots they need to get recorded a priory in order to get used as absolute feature spot maps and therefore involve an effort and generate cost.

b) in reality feature spots can be time variant (e.g. changes of the building structure or radio beacon infrastructure, the content of the building (population, furniture, goods etc.).

c) the fluctuation close by potential feature spots can sometimes be weak and therefore not many distinguishable feature spots can get defined, thus the accuracy might not constantly be good and especially with b) lead to situations that can render them useless.

With regard to feature spots it is important to understand, that some feature spots give an absolute and full position information (x, y, z, and heading, like an entrance into an elevator), others might be partial (x, y, z, like a single radio beacon) or heading (like an aisle if there is only one, or all are in parallel) and only the combination of two or more spatial separated partial feature spots provide all features to recalibrate the full parameters set (location and heading).

Observations show that typical absolute feature spot maps in buildings have spots with 'strong features' (e.g. strong magnetic field fluctuation or direction, i.e. radio signal strength variations, unique combination of unique radio identifiers (MACs) that tend to be comparably robust with regards to b) and consequently c). Thus the strong absolute feature spots can get used for tracking and due to the nature of the absolute feature spots some (e.g. magnetic fluctuations with nonlinear patterns in minimum 2 axis) do provide also heading information. But those absolute feature spots occur on quasi random positions in a building and also over longer time periods might change (change of construction, significant change of use, addition or elimination of radio be infrastructure etc.). In order to eliminate the strong disadvantage a) the invention proposes the creation of absolute feature spots maps by the use of crowd sourced data analytics of inertial location systems and in contrast to e.g. the system of WO 2014/074837 A1 that involves a minimum of one so called 'Seed Landmark' to provide absolute positions, this invention uses relative feature spot maps, consisting of the relation of positions between the relative feature spots and/or individual features of the relative feature spots (that might also get considered micro fingerprint in that sense) and absolute feature spot maps.

Due to the advanced features of state of the art systems, that already are able to recalibrate the dead reckoning positioning by feature spots and the sensors inside the mobile device (smartphone) it is not only possible to recognize the existence of individual feature spots, but to put them in a spatial relation. Even if the bearer of the mobile device is not using direct paths between feature spots it is possible to calculate the direct path or offset with the dead reckoning algorithms, thus relative feature spot maps can get created by recording the relative location relation between the various feature spots.

The invention, therefore, may make use of the fact that a multitude of users can record 3D magnetic field data, or radio beacon field data (e.g. RSS information from multiple base stations, their MAC ID etc.). This will lead to increasingly accurate relative feature spot maps if the relative movement information from the inertial positioning system is added. This will allow identifying the absolute delta positioning of feature spots in the relative feature spot maps that still have a relative relation to the absolute building coordinates. In addition a certain percentage of users will pass absolute feature spots (architecture based or artificial) shortly before or after they pass a number relative feature spots and therefore the relative distance between the absolute feature spot and the other relative feature spot can be determined with high accuracy by using the inertial location system as the accumulated error will be low and in addition over time there will be an increasing amount of users that will provide data and thus the accuracy will even increase. Thus, over time the relative feature spot maps can enhance the absolute feature spot maps.

The spatial distribution of all feature spots (building, magnetic, radio beacons) in combination with their individual features will finally create an absolute feature spot map of a building or of a part, e.g. a floor, of a building. This is true even in the very unlikely case that two exact clones of a building exist and even the interior and all technical installations would be the same, due to the highly likely existence of unique features (like Wi-Fi MAC-IDs or GSM base station IDs).

Each building could have a set of the most common route patterns (generated by automatic map analysis) which may help to match relative feature spot maps to buildings. Repetitive movement patterns, such as walking out of an elevator, and turning left every time; maximum and minimum possible straight line distances (e.g. the longest and the shortest corridor); building height (maximum possible floor number) might also help to match relative feature spot maps to buildings.

Common route patterns could be either generated over time from a database of building maps or only when a building is first detected by the system according to the invention.

Relative feature spot maps will get matched against features available from external and public sources (indoor maps or, if available, base station maps from mobile operators etc.). Geographic and architectural information from a relative feature spot map can get used to match against a map source. The analog is true for other sources (e.g. GPS coordinates of GSM base stations etc.). But combining both will significantly reduce the computation effort to find a match between a relative feature spot map and a building (rough selection of candidates by GSM and then 'puzzling' with buildings in proximity). As already described above it might happen that more than one absolute feature spot map for the same building fit. Some vary in time and thus indicate different usage profiles, but due to unique features can get associated into clusters (the same floor identified by radio beacons with the same radio MAC IDs being strongest, or unique magnetic feature spots). Others might have the same time property, but differ in other details, which is an indicator of different floors in the same building. But by using elevators, stairs or escalators there is even a relation between the absolute feature spot maps of different floors. Either by absolute delta barometer readings (that would give a rapid absolute relation like a first absolute feature spot map is z meters above a second absolute feature spot map), number of steps and direction on the stairs, time and direction spent in the elevator. Thus it will be possible to layer the absolute feature spot maps also in the z-Axis over time. Even in the worst case this will not lead to absolute floor numbers (as some floors might not be allowed to get accessed while using the system), but the likelihood that the provided indoor maps and floors can get matched is significant, especially as some of the users will have GPS turned on and so the ground floor might get easily identified by the last GPS fix from the outside and its relation to a specific relative feature spot map, following an association of the others etc.

Furthermore over time and depending on the repetitive usage of the building strong feature spots can change in cycles. Thus e.g. some feature spots only exist during daytime, or in summer or on Sundays. Thus a multitude of absolute feature spot maps for one building might exist.

In addition and with the more widespread use of publicly available indoor maps it is possible to generate pre-populated external absolute feature spot map of new buildings based on the contained architectural feature spots (corners, elevators, walls and aisles). This will speed up the initial performance of the systems even for the first users of a building or a floor and the respective external absolute feature spot map will then get populated with additional absolute feature spots in different domains (magnetic, radio etc). The same is true to enhance the precision of an absolute feature spot map, especially in sparsely frequented buildings or parts of it, as the automatically generated architectural absolute feature spots can get positioned even more precisely (the map represents the ground truth) or additional, that have not yet been discovered by the users can get added.

Optionally and in an implementation embodiments that have already performed a radio beacon match can announce the recognized building by using short distance radio functionalities like Bluetooth or Wi-Fi in a broadcast mode in order to support other devices to determine their location faster and to reduce the computational overhead on the side of the mobile devices, but also on the side of a service that is performing the matching (e.g. a cloud service or backend). In order to do this either a unique absolute feature spot map designator is going to get associated to each absolute feature spot map and the broadcast include the absolute feature spot map designator, or in an implementation computed absolute coordinates of a position are broadcasted, whereas the computation is performed on the knowledge of the base geolocation of an absolute feature spot map in combination with the relative displacement of the embodiment from the base using inertial dead reckoning and the recalibration by feature spots.

Also optionally and in an implementation the mobile devices can exchange the location of feature spots prior one of them was able to identify a specific absolute feature spot map. Doing so is speeding up the process to find a unique match with the absolute feature spot map by generating longer relative feature spot maps through combining the relative feature spots map or a segment thereof of a first mobile device with the relative feature spots map or a segment thereof of another mobile device and thus even if a specific bearer of an mobile device did not pass all of them the matching between combined relative feature spot maps with absolute feature spot maps becomes faster. As at that moment the different embodiments do not have a knowledge of their absolute position and relation, this can be done by comparing segments of the relative feature spots map and identifying common feature spots, e.g. if a first mobile device passes an elevator (relative feature spot 1) and after 3 m takes a turn of 90° to the left (relative feature spot 2) and then moves 25 m straight (relative feature spot 3) and in the middle of the straightway there is a magnetic anomaly (relative feature spot 4), it might extend the relative feature spot map with the help of a second mobile device that transmitted that it passed a 25 m straight line (relative feature spot 3) with a magnetic anomaly (relative feature spot 4) in the middle and after took a turn to the left (relative feature spot 5), walked 25 stairs up (relative feature spot 6), passed a situation where only one Wi-Fi base station with MAC-Id 'A' was received (relative feature spot 7). So in this example the first mobile device, that has knowledge of the relation of the relative feature spots 1 to 4, would be able to understand that the second mobile device also passed relative feature spot 3 and relative feature spot 4 and thus can extend its relative feature spot map by relative feature spots 5 to 7 even if it did not pass them. Both mobile devices now would have a relative feature spot map having more relative feature spots, namely the relative feature spots 1 to 7 and thus are able to identify matching absolute feature spot map better and faster.

All this needs also to get considered time variant with regards to the fact that changes of the building over a longer time will change the absolute feature spot maps, but even in case of construction etc. the system will adapt to the new reality through new data generated by the users and thus only temporary the accuracy of the building detection, absolute positioning and recalibration will drop.

Thus the invention will generate automatically a set absolute feature spot maps, consisting of a magnitude of feature spots, characterized by additional feature spots in different domains (magnetic, radio, architecture etc.). The effect of the invention for inertial location systems is as follows:

a) a system according to the invention can obtain an information about the absolute position of a user, even if no prior GPS fix or similar (seed landmark feature spot etc.) is available by pure movement inside of a building by matching a relative and partial feature spot map observed by embodiments (smartphones) with absolute feature spot maps.

b) The correct (unique) match making between relative feature spot maps and absolute feature spot maps can get enhanced by joining observations of different embodiments in order to create longer relative feature spot maps faster.

c) The reference points in the absolute feature spot map help to recalibrate the inertial location systems of the users permanently.

d) The collection of sensor data from all users helps to create absolute feature spot maps automatically.

e) Absolute feature spot maps can get matched with publicly available information sources in order to connect the relative position of feature spots to absolute coordinates.

f) The system according to the invention also allows the recursive enhancement of absolute feature spot maps by importing additional feature spots from publicly available maps after the matching in e) occurred. Also existing feature spots can get enhanced as the maps represent the ground truth.

g) The fixed relation of feature spots inside an absolute feature spot map allows the combination of relative feature spots to provide the functionality of an absolute feature spot and thus a recalibration of all location parameters (position and heading) in order to correct the accumulation of errors of the dead reckoning algorithms and to support the unattended learning of them.

With respect to the apparatuses and the methods of the described embodiments the following shall be mentioned:

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, which is stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may be configured, for example, to be transferred via a data communication connection, for example via the Internet.

A further embodiment comprises a processing means, for example a computer, or a programmable logic device, configured or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCE SIGNS 1 mobile device
2 central processing unit
3 user input/output devices
4 motion sensors
5 proximity sensors
6 memory
7 long range wireless interface
8 short range wireless interface
9 optical sensor
10 magnetic field strength sensor
11 gyroscope
12 accelerometer
13 magnetic field direction sensor
14 air-pressure sensor
15 relative feature spot map establishing module
16 absolute coordinates determining module
17 relative feature spot map establishing module
18 absolute coordinates determining module
19 memory
20 absolute feature spot map establishing module
$K_x$, $K_y$, $K_z$ base stations
K communication network
OB optical beacon
MG magnetic field generator
RSM relative feature spot map
ASM absolute feature spot map
EASM external absolute feature spot map
POS position of the mobile device
RWF radio wave field
W electromagnetic beacon
ST staircase
EV elevator
WA walls
DO doors
MAF magnetic field
MF magnetic fluctuation spot
CRP common route patterns
M' movement of the mobile device

The invention claimed is:

1. A mobile device configured for determining a position of the mobile device within buildings, the mobile device comprising:
   one or more motion sensors being configured for detecting directions and/or distances of a movement of the mobile device;
   one or more proximity sensors being configured for detecting characteristics of one or more electromagnetic fields;
   a relative feature spot map establishing processor configured for establishing one or more relative feature spot maps comprising relative coordinates of the movement of the mobile device and relative coordinates of relative feature spots, wherein the establishing of the one or more relative feature spot maps is based on the detected directions and/or distances of the movement of the mobile device and based on the detected characteristics of the one or more electromagnetic fields;
   wherein the relative feature spot map establishing processor is configured for transmitting the one or more relative feature spot maps to an absolute coordinates determining processor configured for determining absolute coordinates of the mobile device;
   wherein the absolute coordinates determining processor is configured for receiving a plurality of absolute feature spot maps from a memory, wherein each absolute feature spot map of the absolute feature spot maps comprises absolute coordinates of feature spots of one building of the buildings;
   wherein the absolute coordinates determining processor is configured for determining the absolute coordinates of the position of the mobile device by determining to which absolute feature spot map of the absolute feature spot maps the one or more relative feature spot maps correspond;
   wherein the absolute coordinates determining processor is configured for determining the absolute coordinates by matching a spatial relation of the relative feature spots of the one or more relative feature spot maps to a spatial relation of the absolute feature spots of each of the absolute feature spot maps.

2. The mobile device according to claim 1, wherein the mobile device comprises the absolute coordinates determining processor and/or the memory.

3. The mobile device according to claim 1, wherein the absolute coordinates determining processor and/or the memory are located at a remote location, wherein the relative feature spot map establishing processor is configured for transmitting the relative feature spot map to the absolute coordinates determining processor using a wireless interface of the mobile device.

4. The mobile device according to claim 1, wherein the one or more proximity sensors comprise a short range wireless interface, an optical sensor and/or a magnetic field strength sensor.

5. The mobile device according to claim 1, wherein the one or more motion sensors comprise a gyroscope, an accelerometer, magnetic field direction sensor and/or an air-pressure sensor.

6. The mobile device according to claim 1, wherein the relative feature spot map establishing processor is configured for determining the relative coordinates of electromagnetic field strength fluctuation spots, electro-magnetic beacons and/or architectural reference points and for incorporating such coordinates into the relative feature spot map as relative feature spots.

7. A relative feature spot map establishing processor configured for determining a position of a mobile device within buildings, wherein the mobile device comprises:
- one or more motion sensors being configured for detecting directions and/or distances of a movement of the mobile device;
- one or more proximity sensors being configured for detecting characteristics of one or more electromagnetic fields;
- wherein the relative feature spot map establishing processor is configured for establishing one or more relative feature spot maps comprising relative coordinates of the movement of the mobile device and relative coordinates of relative feature spots, wherein the establishing of the one or more relative feature spot maps is based on the detected directions and/or distances of the movement of the mobile device and based on the detected characteristics of the one or more electromagnetic fields;
- wherein the relative feature spot map establishing processor is configured for transmitting the one or more relative feature spot maps to an absolute coordinates determining processor configured for determining absolute coordinates of the position of the mobile device;
- wherein the absolute coordinates determining processor is configured for receiving a plurality of absolute feature spot maps from a memory, wherein each absolute feature spot map of the absolute feature spot maps comprises absolute coordinates of feature spots of one building of the buildings;
- wherein the absolute coordinates determining processor is configured for determining the absolute coordinates of the position of the mobile device by determining to which absolute feature spot map of the absolute feature spot maps the one or more relative feature spot maps corresponds;
- wherein the absolute coordinates determining processor is configured for determining the absolute coordinates by matching a spatial relation of the relative feature spots of the one or more relative feature spot maps to a spatial relation of the absolute feature spots of each of the absolute feature spot maps.

8. An absolute coordinates determining processor configured for determining the absolute coordinates of a position of a mobile device within buildings, wherein the mobile device comprises:
- one or more motion sensors being configured for detecting directions and/or distances of a movement of the mobile device;
- one or more proximity sensors being configured for detecting characteristics of one or more electromagnetic fields;
- a relative feature spot map establishing processor configured for establishing one or more relative feature spot maps comprising relative coordinates of the movement of the mobile device and relative coordinates of relative feature spots, wherein the establishing of the one or more relative feature spot maps is based on the detected directions and/or distances of the movement of the mobile device and based on the detected characteristics of the one or more electromagnetic fields;
- wherein the absolute coordinates determining processor is configured for receiving the one or more relative feature spot maps from the relative feature spot map establishing processor;
- wherein the absolute coordinates determining processor is configured for receiving a plurality of absolute feature spot maps from a memory, wherein each absolute feature spot map of the absolute feature spot maps comprises absolute coordinates of feature spots of one building of the buildings;
- wherein the absolute coordinates determining processor is configured for determining the absolute coordinates of the position of the mobile device by determining to which absolute feature spot map of the absolute feature spot maps the one or more relative feature spot map corresponds;
- wherein the absolute coordinates determining processor is configured for determining the absolute coordinates by matching a spatial relation of the relative feature spots of the one or more relative feature spot maps to a spatial relation of the absolute feature spots of each of the absolute feature spot maps.

9. A system comprising one or more mobile devices, a relative feature spot map establishing processor, an absolute coordinates determining processor and a memory, the system being configured for determining a position of the one or more mobile devices within buildings, each mobile device of the one or more mobile devices comprising:
- one or more motion sensors being configured for detecting directions and/or distances of a movement of the mobile device;
- one or more proximity sensors being configured for detecting characteristics of one or more electromagnetic fields;
- wherein the relative feature spot map establishing processor is configured for establishing one or more relative feature spot maps comprising relative coordinates of the movement of the mobile device and relative coordinates of relative feature spots, wherein the establishing of the one or more relative feature spot maps is based on the detected directions and/or distances of the movement of the mobile device and based on the detected characteristics of the one or more electromagnetic fields;
- wherein the relative feature spot map establishing processor is configured for transmitting the one or more relative feature spot maps to the absolute coordinates determining processor configured for determining absolute coordinates of the position of the mobile device;
- wherein the absolute coordinates determining processor is configured for receiving a plurality of absolute feature spot maps from the memory, wherein each absolute feature spot map of the absolute feature spot maps comprises absolute coordinates of feature spots of one building of the buildings;
- wherein the absolute coordinates determining processor is configured for determining absolute coordinates of the position of the mobile device by determining to which absolute feature spot map of the absolute feature spot maps the one or more relative feature spot maps correspond;
- wherein the absolute coordinates determining processor is configured for determining the absolute coordinates by matching a spatial relation of the relative feature spots of the one or more relative feature spot maps to a spatial relation of the absolute feature spots of each of the absolute feature spot maps.

10. The system according to claim 9, wherein the system comprises an absolute feature spot map establishing processor configured for establishing and/or for refining of the plurality of absolute feature spot maps based on one or more external absolute feature spot maps and based on the one or more relative feature spot maps provided from the one or more mobile devices.

11. The system according to claim 10, wherein the absolute feature spot map establishing processor is configured for incorporating a map of structural elements of one building of the buildings and/or a map of electro-magnetic beacons of one building of the buildings, which are comprised by the one or more external feature spot maps, into the absolute feature spot map.

12. The system according to claim 10, wherein the absolute feature spot map establishing processor is configured for incorporating absolute coordinates of common route patterns and absolute coordinates of at least a part of the feature spots derived from the one or more relative feature spot maps provided from the one or more mobile devices into the one or more absolute feature spot maps.

13. The system according to claim 9, wherein the system is configured in such way that the composition of the absolute feature spot maps of the plurality of absolute feature spot maps depends on time and/or date.

14. The system according to claim 9, wherein the one or more mobile devices are configured for communication with other mobile devices of the one or more mobile devices via a short range wireless interface.

15. The system according to claim 14, wherein the communication allows: transmitting of the absolute coordinates of the position of a first mobile device of the one or more mobile devices from the first mobile device to a second mobile devices of the one or more mobile devices, transmitting an identification code of the one or more absolute feature spot maps, which comprise the absolute coordinates of the position of the respective mobile device, from the first mobile device to a second mobile devices of the one or more mobile devices, transmitting the absolute coordinates of one feature spot of one of the one or more relative feature spot maps from the first mobile device to a second mobile devices of the one or more mobile devices and/or transmitting at least a segment of one relative feature spot map of the one or more relative feature spot maps from the first mobile device to the second mobile device of the one or more mobile devices allowing the relative feature spot map establishing processor of the second mobile device to join the segment of the one relative feature spot map of the one or more relative feature spot maps from the first mobile device to a segment of one relative feature spot map of the one or more relative feature spot maps of the second mobile device in case the segment of the first mobile device and the segment of the second mobile device are overlapping.

16. A method for determining a position of a mobile device within buildings, the method comprising:

establishing a plurality of absolute feature spot maps, wherein each absolute feature spot map of the absolute feature spot maps comprises absolute coordinates of feature spots of one building of the buildings;

establishing one or more relative feature spot maps comprising relative coordinates of a movement of the mobile device and relative coordinates of relative feature spots, wherein the establishing of the one or more relative feature spot maps is based on directions and/or distances of a movement of the mobile device and on characteristics of one or more electromagnetic fields, which are detected by using one or more motion sensors of the mobile device and by using one or more proximity sensors of the mobile device;

determining absolute coordinates of the position of the mobile device by determining to which absolute feature spot map of the absolute feature spot maps the one or more relative feature spot maps correspond and by matching a spatial relation of the relative feature spots of the one or more relative feature spot maps to a spatial relation of the absolute feature spots of each of the absolute feature spot maps.

17. A non-transitory digital storage medium having a computer program stored thereon to perform the method for determining a position of a mobile device within buildings, the method comprising:

establishing a plurality of absolute feature spot maps, wherein each absolute feature spot map of the absolute feature spot maps comprises absolute coordinates of feature spots of one building of the buildings;

establishing one or more relative feature spot maps comprising relative coordinates of a movement of the mobile device and relative coordinates of relative feature spots, wherein the establishing of the one or more relative feature spot maps is based on directions and/or distances of a movement of the mobile device and on characteristics of one or more electromagnetic fields, which are detected by using one or more motion sensors of the mobile device and by using one or more proximity sensors of the mobile device;

determining absolute coordinates of the position of the mobile device by determining to which absolute feature spot map of the absolute feature spot maps the one or more relative feature spot maps correspond and by matching a spatial relation of the relative feature spots of the one or more relative feature spot maps to a spatial relation of the absolute feature spots of each of the absolute feature spot maps;

when said computer program is run by a computer.

* * * * *